United States Patent [19]

Negishi et al.

[11] Patent Number: 4,514,075
[45] Date of Patent: Apr. 30, 1985

[54] AUTOMATIC CONTROL APPARATUS FOR PHOTOGRAPHIC CAMERA

[75] Inventors: Kiyoshi Negishi; Masahiro Kawasaki, both of Tokyo; Eiichi Tano, Kamifukuoka, all of Japan

[73] Assignee: Asahi Kogaku Kogyo Kabushiki Kaisha, Tokyo, Japan

[21] Appl. No.: 258,043

[22] Filed: Apr. 28, 1981

[30] Foreign Application Priority Data

Apr. 30, 1980 [JP] Japan ............................ 55-59668[U]

[51] Int. Cl.³ .............................................. G03B 7/08
[52] U.S. Cl. .................................................. 354/446
[58] Field of Search ............... 354/23 D, 43, 271, 289

[56] References Cited

U.S. PATENT DOCUMENTS 4,034,383 7/1977 Mashimo et al. .................. 354/43
4,075,641 2/1978 Uno et al. ........................... 354/43
4,210,393 7/1980 Ishiguro et al. .................... 354/43

Primary Examiner—Russell E. Adams
Attorney, Agent, or Firm—Christie, Parker & Hale

[57] ABSTRACT

In an automatic diaphragm stop down operation square wave pulses are generated, the number of which represents the extent of diaphragm stop down. Short pulses are generated responsive to the leading and trailing edges of the square wave pulses. The short pulses are counted. After a predetermined number of short pulses are counted, diaphragm stop down is arrested. In one embodiment, when a periodic input signal representative of the extent of diaphragm stop down rises above a first threshold, the square wave pulses are produced at a first level and when the input signal drops below a second threshold lower than the threshold, the square wave pulses are produced at a second level.

12 Claims, 11 Drawing Figures

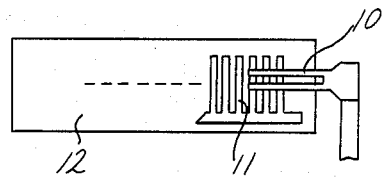
Fig-6
Fig-7
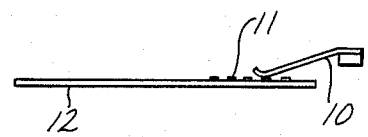
Fig-8
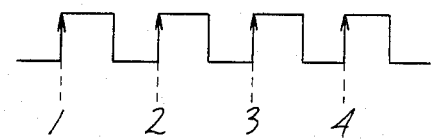
Fig-9
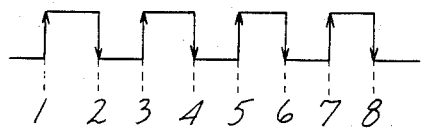

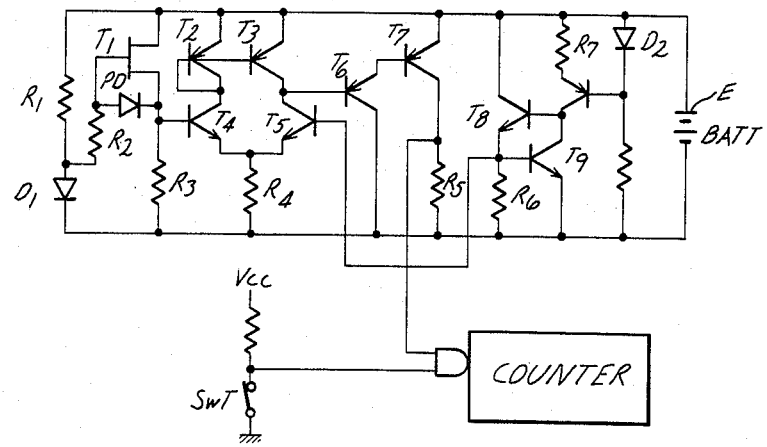
PRIOR ART
Fig - 10
Fig - 11
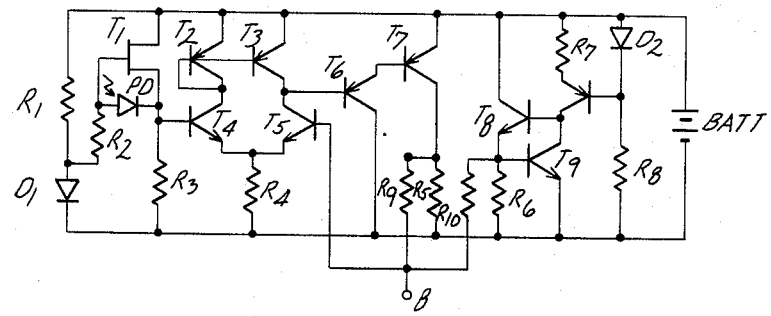

AUTOMATIC CONTROL APPARATUS FOR PHOTOGRAPHIC CAMERA

BACKGROUND OF THE INVENTION

The present invention relates to a diaphragm control circuit. Recently, there has most often been employed so-called through-the-lens photometry with fully opened diaphragm, in which a light quantity or luminance coming through the fully opened diaphragm from an object to be photographed is received by a photoconductive element disposed within the camera, and thereby a desired photometry is achieved so that a proper diaphragm value for proper exposure is calculated from a luminance measured as coming through the objective with the diaphragm fully opened, a preset shutter speed, sensitivity of the film used and an exposure multiple. After shutter release, the diaphragm is mechanically regulated to such calculated value. With this method of photometry, it is required to detect a diaphragm value at every moment in the course of progressive diaphragm regulation, to feed back this to a calculation circuit of the camera to be compared therein with the calculated diaphragm value, and thereby to arrest said progressive diaphragm regulation upon coincidence of both values so as to fix the diaphragm value attained at this moment.

Such method based upon detection of progressive variation in the movement of the diaphragm may be substantially classified into two types. The first type is such that the light quantity actually coming through the lens diaphragm is measured and the second type is such that a pulse generator carried by part of a member operatively associated with the lens stop down member generates pulses the number of which depends upon the actual extent of diaphragm stopping down. These pulses are counted to detect the actual diaphragm value at every moment. With the former type, it is extremely difficult to detect an accurate diaphragm value for photographing in a relatively dark environment, since the light quantity passing through the objective is sharply reduced as the diaphragm is stopped down near the lowest value. In the latter type, on the other hand, the detection of accurate diaphragm value is possible even in a dark environment, since the detection is independent of such light quantity passing through the objective. The latter is also advantageous in that the precision at which an actual diaphragm value at every moment can be detected may be substantially improved by increasing the unit number of pulses to be generated at every step of stopping down; if there are provided a plurality of steps of stopping down representing the light quantity varying in a series of multiples, a predetermined unit number of pulses is associated with each step of stopping down. However, the requirement for mechanical precision imposes a limitation on the extent to which the unit number of pulses in each step can be effectively increased.

SUMMARY OF THE INVENTION

According to one feature of the invention, the precision of an automatic diaphragm stop down operation is improved by an electronic technique. Square wave pulses are generated, the number of which represents the extent of diaphragm stop down. Short pulses are generated responsive to the leading and trailing edges of the square wave pulses. The short pulses are counted. After a predetermined number of short pulses are counted, diaphragm stop down is arrested.

According to another feature of the invention, noise immunity is increased in pulse generating circuitry for arresting diaphragm stop down. When a periodic input signal the number of repetitions of which is representative of the extent of diaphragm stop down rises above a first threshold, an output pulse signal at a first level is produced and when the input signal drops below a second threshold lower than the threshold, an output pulse signal at a second level is produced. The pulses of the output signal are counted, and diaphragm stop down is arrested after a predetermined number of such pulses occur.

BRIEF DESCRIPTION OF THE DRAWINGS

The features of specific embodiments of the best mode contemplated of carrying out the invention are illustrated in the drawings, in which:

FIGS. 6 and 7 are schematic side and bottom views, respectively, of another embodiment for generating pulses, the number of which is representative of the extent of diaphragm stop down;

FIG. 8 is a wave form diagram depicting the conventional counting technique of photointerrupter generated pulses;

FIG. 9 is a wave form diagram depicting the technique according to the invention for counting photointerrupter generated pulses;

FIG. 10 is a schematic circuit diagram of a conventional pulse generator; and

FIG. 11 is a schematic circuit diagram of a portion of another embodiment of a pulse generator incorporating principles of the invention.

DETAILED DESCRIPTION OF THE SPECIFIC EMBODIMENTS

Figure 1:
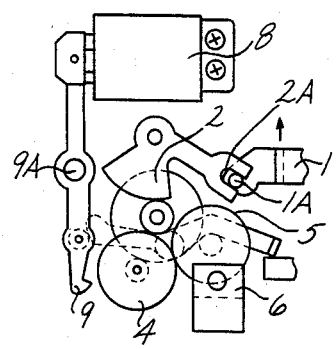
FIG. 1 is a schematic diagram of apparatus for stopping down a diaphragm in a phtographic camera.
Figure 2:
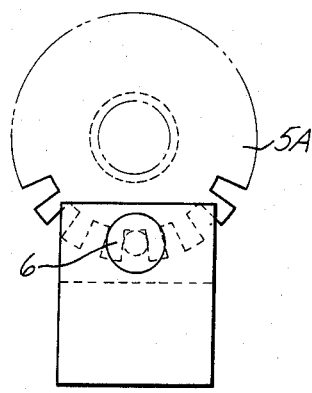
FIGS. 2 and 3 are schematic front and side views, respectively, of a photointerrupter for generating pulses, the number of which represents the extent of diaphragm stop down.
Figure 3:
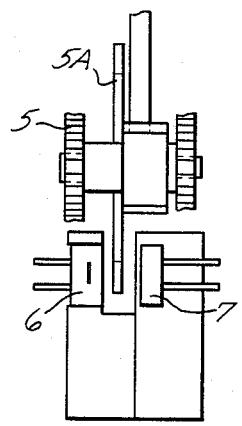

A mechanism adapted to generate pulses corresponding to the extent of stopping down is by way of example shown by FIGS. 1 to 3. Referring to FIG. 1, reference numeral 1 designates a member operatively associated with a diaphragm stop down member provided on the objective, which is moved in the direction of an arrow as operation of stopping down progresses. A pin 1A fixed on the member 1 is always engaged by a bifurcate portion 2A of an integral lever/sector gear 2, and thus vertical movement of the member 1 as indicated by the arrow is converted into a rotational movement of the sector gear 2, and thence of a transmission gear 3, which, in turn, rotates an interlocking gear 5 through rotation of a gear 4. The interlocking gear 5 is attached to a code disc 5A having a plurality of radial slits formed therein.

Across the code disc 5A and particularly a zone defined by rotation of the slitted portion thereof, there are provided a light emitting diode 6 and a photodiode 7, as a light receiving element, in opposition to each other to form a chopper, which serves as a photointerrupter.

When no slit is present on the optical path connecting said light emitting diode 6 and said photodiode 7, the light beam emitted from said light emitting diode 6 is interrupted before reaching the photodiode 7, resulting in a reduced photocurrent output from the photodiode 7. The presence of the slit in the optical path causes the light beam of the light emitting diode 6 to be incident upon the photodiode 7 and thereby increases said photocurrent output from said photodiode 7. Voltage conversion and pulse-shaping of said photocurrent output from the photodiode 7 provide a pulse output depending upon the movement of the members during operation of stop down. Reference is made to a co-pending application of Hiroshi Kurei filed on even date herewith entitled CAMERA RESET APPARATUS now U.S. Pat. No. 4,360,257 for a more detailed description of the diaphragm stop down system and the related reset apparatus; the disclosure of this application is incorporated fully herein by reference. To improve the detectable resolution of the movement of the diaphragm, the number of slits formed in the code disc 5A may be correspondingly increased, but this is limited by the requirement for mechanical precision.

The present invention doubles the detectable resolution precision for the progressive movement of the diaphragm and doubles the accuracy of diaphragm control by counting the output pulses from the photointerrupter at both their leading and trailing edges, while a code disc having only a reasonable number of slits from the viewpoint of mechanical precision.

Figure 4:
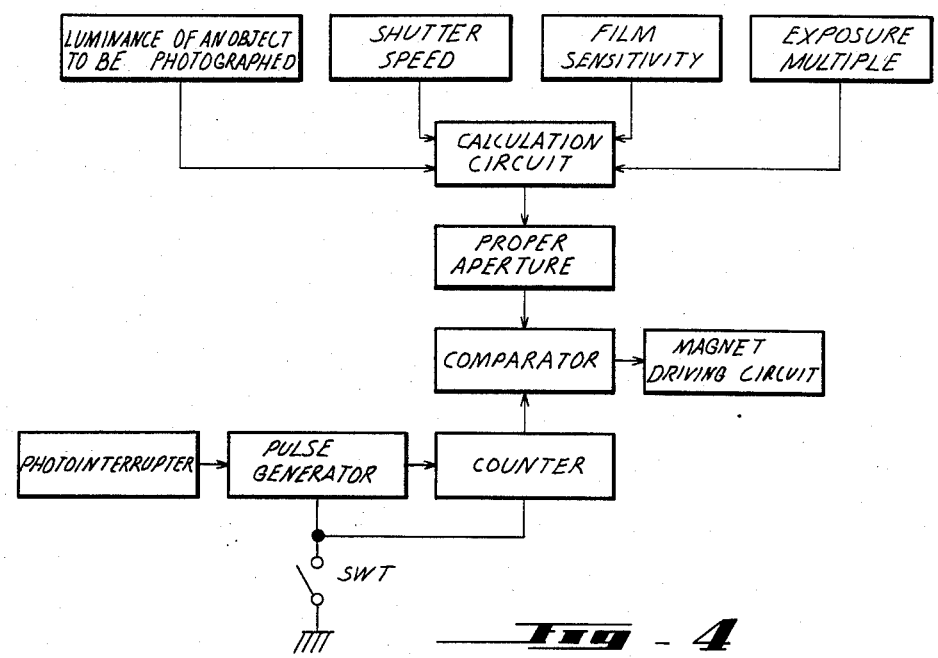
FIG. 4 is a block diagram of an automatic diaphragm control circuit.

FIG. 4 is a block diagram illustrating the diaphragm control circuit constructed according to the present invention. The output of the photointerrupter is converted into the pulse output in a pulse generator. The pulse generator provides at all slit transitions, i.e., slit to no slit or no slit to slit, short pulses, which are applied to a counter. Reference symbol SWT designates a timing switch adapted to be opened before stop down of the objective begins and to remain open during stop down. The function of this switch may be achieved by the shutter release switch or the like responsive to the shutter release pin. When SWT closes, the counter is reset to its zero state and the pulse generator becomes activated. The output of the counter is compared with the proper diaphragm aperture value calculated on the basis of exposure factors such as luminance of an object to be photographed, a preset shutter speed, a sensitivity of film used, and an exposure multiple. The comparator activates a magnet driving circuit upon coincidence of both values, i.e., when the counter reaches a state determined by the proper aperture value. The magnet driving circuit then drives a diaphragm control magnet 8 as shown in FIG. 1, which, in turn, causes a locking tooth 9 formed on the lower end of a lever pivotally supported around a pivot 9A to engage the gear 4. Gear 4 is then locked thereby against further rotation, and the member 1 is also arrested. Thus, operation of stop down is arrested and the objective is adjusted to a proper diaphragm value. Reference is made to application Ser. No. 235,839, filed Feb. 19, 1981, for a more detailed description of a diaphragm control circuit that could be employed with the photointerrupter, pulse generator, and counter represented in FIG. 4; the disclosure of this application is incorporated fully herein by reference.

FIG. 10 is a circuit diagram illustrating a prior art embodiment of the pulse generator represented in FIG. 4 connected to a counter as shown in FIG. 4. FIG. 8 is a diagram of the square wave pulses produced by the pulse generator of FIG. 10 when switch SWT is opened and code disc 5A rotates as the diaphragm stops down; the pulse generator generates pulses of the form represented in FIG. 8. These pulses are coupled through an AND gate to the counter. At the leading edge of each square wave pulse as represented by upwardly directed arrows in FIG. 8, the counter advances one state. Therefore, the counter counts the leading edges of these pulses, which represent the number of slits passing across the optical path.

Figure 5:
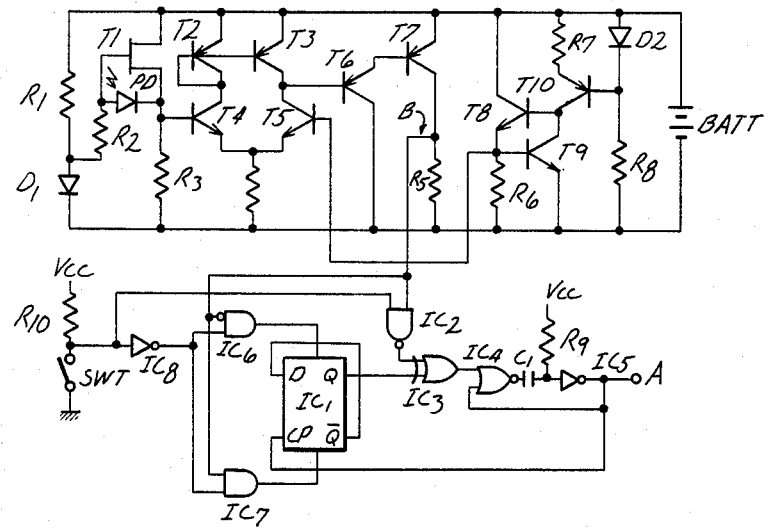
FIG. 5 is a schematic circuit diagram of a pulse generator incorporating principles of the invention.

FIG. 5 is a circuit diagram illustrating a specific embodiment of a circuit comprising the combination of the photointerrupter and the pulse generator according to the invention. The initial portion of this pulse generator is the same as the prior art pulse generator of FIG. 10 and generates pulses having the same square wave form depicted in FIG. 8. The remainder of this pulse generator, however, produces short pulses responsive to the leading and trailing edges of the square wave pulses as depicted by the upwardly directed and downwardly directed arrows in FIG. 9. The result is twice the number of short pulses as there are slits in the code disc, which increases the resolution and accuracy of the control circuitry. Referring to FIG. 5, reference symbol PD designates the element corresponding to the photodiode 7 as shown in FIG. 3, which is adapted to be exposed to the light beam emitted from the light emitting diode 6 so that said photodiode PD is exposed to said light beam when the slit is present in the optical path connecting the light emitting diode 6 and the photodiode 7, and does not receive said light beam when no slit is present in said optical path. The photocurrent output from the photodiode PD is converted by a FET transistor $T_1$ and resistors $R_2$, $R_3$ into the corresponding voltage, which is then applied to the base of a transistor $T_4$ serving as an inverted input terminal of a comparator comprising transistors $T_2$ to $T_7$ and resistors $R_4$, $R_5$. To the base of a transistor $T_5$, which is a noninverted input terminal, is applied a reference voltage formed by transistors $T_8$ to $T_{10}$, resistors $R_6$ to $R_8$ and diode $D_2$. $IC_1$ and $IC_6$ to $IC_8$ together with $IC_3$ constitute a frequency multiplier having set and reset. $IC_4$, $IC_5$, capacitor $C_1$, and resistor $R_9$ constitute a one-shot multivibrator. $IC_1$ is a D Flip-flop, $IC_6$ and $IC_7$ are AND gates, $IC_8$ is an inverter, $IC_4$ is a NOR gate, and $IC_5$ is an inverter. SWT is the same switch shown in FIG. 4. It should be noted, referring to FIG. 5 also, that Vcc is connected to the positive terminal of a direct current power source. $IC_6$ to $IC_8$ function to set or reset the D flip-flop $IC_1$ depending upon the comparator output so long as the timing switch SWT is closed so that $IC_1$ is in the proper state relative to code disc 5A when stop down begins, i.e., at H-level when a slit is in the optical path and L-level when no slit is in the optical path. In this case, said timing switch SWT serves also to reset the counter to its zero state. When the photodiode PD is exposed to the light beam, the base potential of the transistor $T_4$ rises and when this base potential exceeds the reference voltage applied to the base of the transistor $T_5$, the transistor $T_7$ becomes nonconductive. As a result, the potential at B assumes a low level hereafter called L-level. When the photodiode PD does not receive the light beam, the base potential of the transistor $T_4$ drops; when said base potential becomes lower than the base potential of the transistor $T_5$, the transistor $T_7$ becomes conductive, and as a result the potential at B assumes a high level hereafter called H-level. Thus square wave pulses are generated at point B.

When the objective is stopped down beginning from the state in which the slit is present on the optical path of the photocoupler comprising the light emitting diode 6 and the photodiode 7, the interlocking gear 5 begins to rotate and thereby the code disc 5A arranged integrally with said gear 5 also rotates, interrupting the chopper's optical path, so that the potential at in the circuit shown of FIG. 5 rises from L-level to H-level. The timing switch SWT is opened before stop down of the objective begins, and therefore the inverted output with respect to the potential at B appears on the NAND gate $IC_2$, dropping from H-level to L-level. As described below, the Q output of the D flip-flop $IC_1$ is at H-level, so that the output of the exclusive OR gate $IC_3$ changes from L-level to H-level. The output of the NOR gate $IC_4$ drops to L-level. In consequence, the input to the inverter $IC_5$ instantaneously drops to L-level and the output of $IC_5$ rises to H-level. Input to the inverter $IC_5$ rises to H-level in accordance with the time constant of the capacitor $C_1$ and the resistor $R_9$, causing the output from inverter $IC_5$ to drop to L-level. Thus, a short pulse is generated at point A. When the output of the inverter $IC_5$ drops from H-level to L-level, the Q output of the D flip-flop $IC_1$ is inverted to the L-level so that the output of the exclusive OR gate $IC_3$ drops to L-level while the output of the OR gate $IC_4$ rises again to H-level. The described operation occurs as code disc 5A rotates from a slit to no slit in the optical path of the photocoupler.

Since the code disc 5A rotates continuously, the slit appears again in the optical path and the photodiode PD is exposed again to the light beam from the light emitting diode. At such time, the potential at the point B in FIG. 5 drops from the H-level to L-level. The output of $IC_2$ rises to H-level. The Q output of the D flip-flop $IC_1$ is at L-level so that the output of the exclusive OR gate $IC_3$ rises again from L-level to H-level to make the output of the NOR gate $IC_4$ drop from H-level to L-level. The input of the inverter $IC_5$ instantaneously assumes L-level and the output thereof assumes H-level. The input of the inverter $IC_5$ rises to H-level at a point in time depending upon the time constant of the capacitor $C_1$ and the resistor $R_9$ while the output thereof drops to L-level. Thus another short pulse is generated at point A. In response to change of the output from the inverter $IC_5$ from H-level to L-level, the Q output of the D flip-flop $IC_1$ is inverted to H-level, the output of the exclusive OR gate $IC_3$ drops to L-level, and the output of the NOR gate $IC_4$ rises to H-level. Thus, in response both to the leading edge and the trailing edge of the pulses generated at the point B, short pulses are generated at the output of the inverter $IC_5$, namely at point A, and $IC_1$ is inverted.

In summary, while SWT is open, the output of exclusive OR gate $IC_3$ rises from L-level to H-level at the leading edge of each pulse generated at point B and at the trailing edge of each pulse generated at point B, thereby producing short pulses at point A at the leading and trailing edges of the pulses generated at point B. At the end of each short pulse produced at point A, $IC_1$ is inverted so both inputs of $IC_3$ are at the same level immediately before each slit transition of the code disc. When the slit transition occurs, the input of $IC_3$ connected to $IC_2$ changes level, thereby causing the output of $IC_3$ to rise to H-level. It is important to the described mode of operation that $IC_1$ be maintained in the proper state prior to the opening of SWT. This is accomplished by $IC_6$, $IC_7$, and $IC_8$. When SWT is closed, $IC_1$ is set by $IC_6$ responsive to L-level at point B so the Q output of $IC_1$ is at H-level and is reset by $IC_7$ responsive to H-level at point B so the Q output of $IC_1$ is at L-level. Thus, $IC_1$ is in the proper state relative to code disc 5A when SWT opens, namely the same state as the output of $IC_2$, so that upon the next slit transition, when the output of $IC_2$ changes level, the output of $IC_3$ rises to H-level.

It should be noted that before stop down while SWT is closed, pulses are produced at point A each time point B drops to L-level, but these pulses do not cause inaccuracy because the counter is reset to its zero state upon the opening of SWT.

A counter counts the pulses generated at the point A and, therefore, counts the number of pulses corresponding to twice the number of the slits that actually intersect the optical path defined between the light emitting diode 6 and the photodiode 7 as shown in FIG. 3. This effectively doubles the resolution for more accurately detecting the extent of lens stop down movement, since the diaphragm control is effected on the basis of the output from this counter.

FIG. 11 shows another embodiment of a circuit constructed according to the present invention to obtain a pulse doubling. The same reference numerals given in FIG. 5 designate the same members, respectively. Referring to FIG. 11, reference numerals $R_9$ and $R_{10}$ designate resistors to give the comparator a hysteresis. When any one of the slits formed in the code disc 5A is present in the optical path of the photocoupler comprising the light emitting diode 6 and the photodiode 7 as shown in FIG. 3, the light quantity to which the photodiode 7 is exposed increases and, as a result, the base potential of the transistor $T_4$ rises. At this point in time, the transistor $T_7$ becomes nonconductive and the potential at the point B drops to L-level. The base potential of the transistor $T_5$ corresponds to:

$$\frac{(R_5 + R_9)}{(R_5 + R_9) + R_{10}} \times \text{(the base potential of } T_9)$$

which is lower than in the circuit without said resistors $R_9$, $R_{10}$. Accordingly, the light beam to the photodiode PD is interrupted and, even when the base potential of the transistor $T_4$ drops, the transistor $T_7$, will become conductive only after the base potential of the transistor $T_4$ further drops relative to the circuit without said resistors $R_9$, $R_{10}$, because the base potential of the transistor $T_5$ is held low.

With the circuit including said resistors $R_9$ and $R_{10}$, on the contrary, the base potential of the transistor $T_4$ drops and the transistor $T_7$ becomes conductive when the light beam to the photodiode 7 is interrupted with the result that the potential at B rises to H-level. At this time, the base potential of the transistor $T_5$ corresponds to:

$$\frac{R_{10}}{R_9 + R_{10}} \times \text{(source voltage} - \text{base potential of } T_9) +$$

(base (potentail of $T_9$)

which is higher than in the circuit without the resistors $R_9$, $R_{10}$. Accordingly, even when the light quantity to which the photodiode PD is exposed increases and the base potential of the transistor $T_4$ rises, the transistor $T_7$ can become nonconductive only when the base potential of the transistor $T_4$ further rises relative to the circuit without the resistors $R_9$ and $R_{10}$. This means that the pulses appearing at B have a hysteresis with respect to the variation in the base potential of the transistor $T_4$. By thus, in effect changing the reference voltage after each change in level at point B, the threshold is raised and better noise immunity is achieved. It will be understood that the described circuit may be connected to the pulse doubling circuitry shown in the lower portion of FIG. 5 to obtain the desired pulse doubling function, i.e., to $IC_1$ through $IC_{10}$, $C_1$, $R_9$, $R_{10}$, and SWT. As a result, it is also possible to double the precision with which the diaphragm can be arrested under control of the pulses thus doubled and this substantially contributes to improve the total precision for diaphragm control in practice.

Although the embodiments of the present invention have been described with reference to the pulse generator employing the photointerrupter, a modification is also possible such that a metallic contact operatively associated with the lens stopping member slides along electrodes of comb teeth type printed on a base plate as illustrated by FIG. 6. In such embodiment, reference numeral 10 designates said metallic slide contact and reference numeral 11 designates the electrodes of comb teeth type printed on the base plate 12 so that, in response to a movement of the lens stopping member or the member operatively associated therewith, said metallic slide contact 10 slides along said base plate 12 and thereby the circuit is repeatedly opened and closed to generate pulses of which the number depends upon the extent of said sliding movement. The number of pulses thus generated is also doubled under the effect of the pulse generator constructed according to the present invention and accordingly the same advantageous effect as obtained in the previously mentioned embodiments can be achieved from this embodiment. It is obviously possible to move the base plate 12, instead of the metallic slide contact 10, in operative association with the lens stopping member or the member operatively associated therewith, relative to said metallic slide contact 10 being stationary in this modification.

What is claimed is:

1. Automatic control apparatus for a photographic camera comprising:
    means for stopping down a diaphragm;
    first means for generating square wave pulses, the number of which represents the extent of diaphragm stop down, the square wave pulses alternately assuming an H-level and an L-level;
    second means for generating short pulses responsive to the leading and trailing edges of the square wave pulses, the second pulse generating means comprising a bistable device alternately assuming the H-level and the L-level, an exclusive OR gate having a first input, a second input and an output that assumes the H-level when either the first input or the second input but not both assume the H-level, and otherwise assumes the L-level, means for connecting the bistable device to the first input, means for connecting the first pulse generating means to the second input, and means for inverting the state of the bistable device each time the output of the exclusive OR gate assumes the H-level;
    means for counting the short pulses; and
    means for arresting the diaphragm stop down means after a predetermined number of short pulses are counted.

2. The apparatus of claim 1, in which the second pulse generating means additionally comprises a monostable multivibrator connected to the output of the exclusive OR gate to generate a short pulse when the exclusive OR gate assumes its H-level.

3. The apparatus of claim 2, in which the second pulse generating means additionally comprises means prior to stop down of the diaphragm for setting the bistable device at the H-level when the square wave pulses assume the L-level and for resetting the bistable device at the L-level when the square wave pulses assume the H-level.

4. The apparatus of claim 3, in which the counting means comprises a resettable counter and the second pulse generating means additionally comprises means for resetting the counter when stop down of the diaphragm begins.

5. The apparatus of claim 1, in which the first pulse generating means comprises a rotatable code disc having spaced apart slits, a light source on one side of the code disc directed toward the slits, a light detector aligned with the light source on the other side of the code disc, and means responsive to the light detector for generating as the square wave pulses an output signal at the H-level when the detector receives no light and at the L-level when the detector receives light.

6. The apparatus of claim 5, in which the means responsive to the light detector for for generating an output signal comprises means for generating an input signal representative of the light received by the detector and means for producing an output signal at the L-level when the input signal rises above a first threshold and at the H-level when the input signal drops below a second threshold lower than the first threshold.

7. The apparatus of claim 6, in which the producing means comprises a comparator having a first input to which the input signal is applied, a second input, and an output that assumes the L-level when first input rises above the second input and the H-level when the first input drops below the second input, and a source of reference voltage applied to the second input, the reference voltage being larger when the output signal is at the H-level than when the output is at the L-level.

8. Automatic control apparatus for a photographic camera comprising:
    means for stopping down a diaphragm;
    means for generating a periodic input signal, the number of repetitions of which is representative of the extent of diaphragm stop down;
    means for producing an output pulse signal at a first level when the input signal rises above a first threshold and at a second level when the input signal drops below a second threshold lower than the first threshold; and
    means for arresting the diaphragm stop down means after a predetermined number of transitions of the output signal between the first and second levels.

9. The apparatus of claim 8, in which the generating means comprises a rotatable code disc having spaced apart slits, a light source on one side of the code disc directed toward the slits, a light detector aligned with the light source on the other side of the code disc, and means responsive to the light detector for generating the output signal at the first level when the detector receives no light and at the second level when the detector receives light.

10. The apparatus of claim 9, in which the producing means comprises a comparator having a first input to which the input signal is applied, a second input, and an output that assumes the first level when first input rises above the second input and the second level when the first input drops below the second input, and a source of reference voltage applied to the second input, the reference voltage being larger when the output signal is at the second level than when the output signal is at the first level.

11. The apparatus of claim 8, in which the arresting means comprises means for generating a short pulse each time the output pulse signal has a transition from the first level to the second level and each time the output pulse signal has a transition from the second level to the first level, means for counting the short pulses, and means responsive to the counting means for actuating the arresting means.

12. Automatic control apparatus for a photographic camera comprising:
   means for stopping down a diaphragm;
   first means for generating square wave pulses, the number of which represents the extent of diaphragm stop down;
   second means for generating short pulses responsive to the leading and trailing edges of the square wave pulses;
   means for counting the short pulses; and
   means for arresting the diaphragm stop down means after a predetermined number of short pulses are counted.

* * * * *